(12) United States Patent
Shizuku et al.

(10) Patent No.: US 11,585,044 B2
(45) Date of Patent: *Feb. 21, 2023

(54) CORD FOR REINFORCING ELASTOMERS

(71) Applicant: BRIDGESTONE CORPORATION, Tokyo (JP)

(72) Inventors: Takahisa Shizuku, Tokyo (JP); Nobuhiro Ando, Tokyo (JP); Norihiko Kaga, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 16/663,745

(22) Filed: Oct. 25, 2019

(65) Prior Publication Data

US 2020/0055340 A1 Feb. 20, 2020

Related U.S. Application Data

(63) Continuation of application No. PCT/JP2018/016691, filed on Apr. 24, 2018.

(30) Foreign Application Priority Data

Apr. 27, 2017 (JP) .............................. JP2017-089005

(51) Int. Cl.
*D07B 1/16* (2006.01)
*B60C 9/00* (2006.01)
(Continued)

(52) U.S. Cl.
CPC .............. *D07B 1/167* (2013.01); *B60C 9/005* (2013.01); *D07B 1/005* (2013.01); *D07B 1/0633* (2013.01);
(Continued)

(58) Field of Classification Search
CPC ...... D07B 1/005; D07B 1/0633; D07B 1/167; D07B 2501/2046; B60C 9/005
See application file for complete search history.

(56) References Cited

U.S. PATENT DOCUMENTS 4,818,631 A 4/1989 Bourgois
4,969,497 A 11/1990 Bourgois
(Continued)

FOREIGN PATENT DOCUMENTS

BE 900175 A 11/1984
CN 1165221 A 11/1997
(Continued)

OTHER PUBLICATIONS

Extended European Search Report dated Jan. 20, 2021 in European Application No. 18790296.0.
(Continued)

*Primary Examiner* — Shaun R Hurley
(74) *Attorney, Agent, or Firm* — Sughrue Mion, PLLC (57) ABSTRACT

A cord for reinforcing elastomers excellent in adhesion to elastomers such as rubber is provided. The cord is a cord for reinforcing elastomers (10) that includes metallic filaments (1) and a resin filament (2) twisted together, the resin filament (2) being made from a polymeric material having a melting point or softening point of 80 to 160° C. The cord for reinforcing elastomers includes a core and at least one sheath layer, wherein, after vulcanization, a distance w between metallic filaments (1b) forming an outermost sheath layer is 100 μm or less, and, on a cross section of the cord taken along a direction orthogonal to an axial direction, a filling ratio, which is a ratio of an area of a polymeric material (3) derived from the resin filament (2) to a gap region is 52 to 120%, where the gap region is defined as a portion occupied by a material other than the metallic filaments (1) within a region formed by connecting the
(Continued)

centers of the individual metallic filaments (1b) constituting the outermost sheath layer.

19 Claims, 4 Drawing Sheets

(51) Int. Cl.
    *D07B 1/00*         (2006.01)
    *D07B 1/06*         (2006.01)

(52) U.S. Cl.
    CPC ............ *B60C 2009/0085* (2013.01); *B60C 2009/0092* (2013.01); *D07B 2501/2046* (2013.01)

(56) References Cited

U.S. PATENT DOCUMENTS

| | | | |
|---|---|---|---|
| 5,139,874 | A | 8/1992 | Starinshak et al. |
| 5,843,583 | A | 12/1998 | D'Haene et al. |
| 6,007,912 | A | 12/1999 | Doujak |
| 6,334,293 | B1 | 1/2002 | Poethke et al. |
| 10,309,041 | B2 * | 6/2019 | Suefuji ............... D07B 1/0613 |
| 2001/0011569 | A1 | 8/2001 | Miyazaki et al. |
| 2002/0174645 | A1 * | 11/2002 | Nguyen ............... B60C 9/0007 57/213 |
| 2003/0051788 | A1 * | 3/2003 | Besson ................ B60C 9/005 152/451 |
| 2005/0121126 | A1 | 6/2005 | Hirachi et al. |
| 2006/0191619 | A1 | 8/2006 | Meersschaut et al. |
| 2011/0198008 | A1 | 8/2011 | Pottier et al. |
| 2011/0253280 | A1 * | 10/2011 | Matsuo ................ D07B 1/062 152/526 |
| 2012/0055602 | A1 | 3/2012 | Nishimura |
| 2013/0220506 | A1 | 8/2013 | Pottier et al. |
| 2014/0008154 | A1 | 1/2014 | Wesson et al. |
| 2015/0217602 | A1 | 8/2015 | Salgues et al. |
| 2016/0152079 | A1 | 6/2016 | Machida et al. |
| 2019/0329593 | A1 * | 10/2019 | Shizuku ............ B29D 30/0601 |
| 2021/0071360 | A1 * | 3/2021 | Ando .................... D07B 1/062 |

FOREIGN PATENT DOCUMENTS

| | | |
|---|---|---|
| CN | 1341178 A | 3/2002 |
| CN | 1712635 A | 12/2005 |
| CN | 1809664 A | 7/2006 |
| CN | 102459751 A | 5/2012 |
| CN | 102906329 A | 1/2013 |
| CN | 104704163 A | 6/2015 |
| DE | 26 48 524 A1 | 5/1978 |
| EP | 3 476 623 A1 | 5/2019 |
| JP | 60-231884 A | 11/1985 |
| JP | 61-27519 B2 | 6/1986 |
| JP | 63-295779 A | 12/1988 |
| JP | 1-98194 U | 6/1989 |
| JP | 02-033298 U | 3/1990 |
| JP | 5-198212 A | 8/1993 |
| JP | 6-122162 A | 5/1994 |
| JP | 11-512786 A | 11/1999 |
| JP | 2001-214387 A | 8/2001 |
| JP | 2001-234444 A | 8/2001 |
| JP | 2002-538327 A | 11/2002 |
| JP | 3385555 B2 | 3/2003 |
| JP | 2008-297667 A | 12/2008 |
| JP | 2008-308808 A | 12/2008 |
| JP | 2018-104851 A | 7/2018 |
| JP | 6785152 B2 | 11/2020 |
| WO | 00/52254 A1 | 9/2000 |
| WO | 2012/128753 A1 | 9/2012 |
| WO | 2014/175453 A1 | 10/2014 |
| WO | 2017/222046 A1 | 12/2017 |

OTHER PUBLICATIONS

International Search Report for PCT/JP2018/016691 dated Jun. 26, 2018 [PCT/ISA/210].
Chinese Search Report dated Jul. 2, 2021 by the Chinese Patent Office in Chinese Application No. 201880028037.1.
Extended European Search Report dated Dec. 17, 2021 in European Application No. 18890241.5.
International Search Report dated Apr. 2, 2019 issued in International Application No. PCT/JP2018/047386.
Search Report dated Nov. 30, 2021 in Chinese Application No. 201880082401.2.
Office Action dated Jul. 27, 2022 in U.S. Appl. No. 16/955,974.

* cited by examiner

CORD FOR REINFORCING ELASTOMERS

CROSS REFERENCE TO RELATED APPLICATIONS

The present application is a continuation of PCT/JP2018/016691 filed Apr. 24, 2018 which claims priority to Japanese Patent Application No. JP2017-089005 filed Apr. 27, 2017, the disclosures of which are incorporated herein by reference.

TECHNICAL FIELD

The present invention relates to a cord for reinforcing elastomers (which may hereinafter be simply called a "cord"), and to a cord for reinforcing elastomers excellent in adhesion to elastomers.

BACKGROUND ART

As a reinforcement material for tire belts, a steel cord made by twisting steel filaments together has been conventionally used. However, rust may form in the steel cord when, for example, an outside tire surface is damaged and the damage reaches a belt, and moisture and others in the external environment enter a space between steel filaments constituting the steel cord. For this reason, gaps are created in the steel cord so that rubber is caused to penetrate into the steel cord during vulcanization so as to block water paths. Among such solutions, Patent Document 1 proposes a composite cord that is made by twisting together sheath element wires made up of 2 to 12 steel filaments around a core made of a resin filament having a melting point of 50° C. to less than 200° C. The resin filament included in the composite cord is melted during vulcanization to cause rubber to penetrate into the steel filaments, thus preventing the steel filaments from rusting.

RELATED ART DOCUMENT

Patent Document

Patent Document 1: JP2001-234444A

SUMMARY OF THE INVENTION

Problems to be Solved by the Invention

However, during vulcanization, the rubber flows into a region where the resin filaments are present, creating an interface through which a polymeric material derived from the resin filaments and the rubber are in contact with each other. As a result, the interface reduces the adhesion strength by which the rubber and the steel filaments adhere to each other. Therefore, a further improvement is demanded to enhance the durability of tires.

Accordingly, an object of the present invention is to provide a cord for reinforcing elastomers excellent in adhesion to elastomers such as rubber.

Means for Solving the Problems

To solve the above-described problems, the present inventors have conducted extensive studies to make the following findings. When an excessively large amount of a polymeric material, which was noncrystalline, was used relative to void areas on a cross section of the metallic cord, the polymeric material inside leaked out during vulcanization to inhibit adhesion to rubber, and some of the resin was exposed during a tensile test. In contrast, when an excessively small amount was used, voids were insufficiently filled to fail in preventing water from passing; therefore, improvement of the corrosion fatigue resistance cannot be expected. Based on these findings, the present inventors have further conducted extensive studies to find that the above problems can be solved by the configuration described below, and have completed the present invention.

A cord for reinforcing elastomers includes metallic filaments and a resin filament twisted together, the resin filament being made from a polymeric material having a melting point or softening point of 80 to 160° C., wherein the cord for reinforcing elastomers includes a core and at least one sheath layer, and wherein, after vulcanization, a distance between the metallic filaments forming an outermost sheath layer is 100 µm or less, and, on a cross section of the cord taken along a direction orthogonal to an axial direction, a filling ratio, which is a ratio of an area of a polymeric material derived from the resin filament to a gap region is 52 to 120%, where the gap region is defined as a region other than the metallic filaments within a region formed by connecting centers of the individual metallic filaments constituting the outermost sheath layer. The melting point herein refers to a melting peak temperature as measured by the heat flux differential scanning calorimetry described in JIS K 7121. The softening point refers to a value measured by the softening point test method described in JIS K 7206 (1999).

In the cord of the present invention, the polymeric material derived from the resin filament preferably accounts for 60 to 120% of the gap region. In the cord of the present invention, when cross sections of the cord for reinforcing elastomers taken along a direction orthogonal to the axial direction are observed at 2 mm intervals over a range of twice a twist pitch of the outermost sheath layer, three or more voids on adjacent observed sections are preferably not communicatively connected along the axial direction. In addition, in the cord of the present invention, the distance between the metallic filaments forming the outermost sheath layer is preferably 20 µm or less. Furthermore, in the cord of the present invention, the polymeric material preferably includes maleic acid-modified polyethylene or an ionomer. Furthermore, in the cord of the present invention, the resin filament has a wire diameter of 0.1 mm or larger. Furthermore, in the cord of the present invention, a melt flow rate, which is described in JIS K 7210, of the polymeric material is preferably 7.0 g/min. or higher. Furthermore, in the cord of the present invention, the polymeric material preferably has a melting point or softening point of 130 to 160° C. Furthermore, in the cord of the present invention, the core is preferably made by twisting three metallic filaments together.

Effects of the Invention

According to the present invention, a cord for reinforcing elastomers excellent in adhesion to elastomers such as rubber can be provided.

MODE FOR CARRYING OUT THE INVENTION

A cord for reinforcing elastomers of the present invention will now be described in detail with reference to the drawings.

Figure 1:
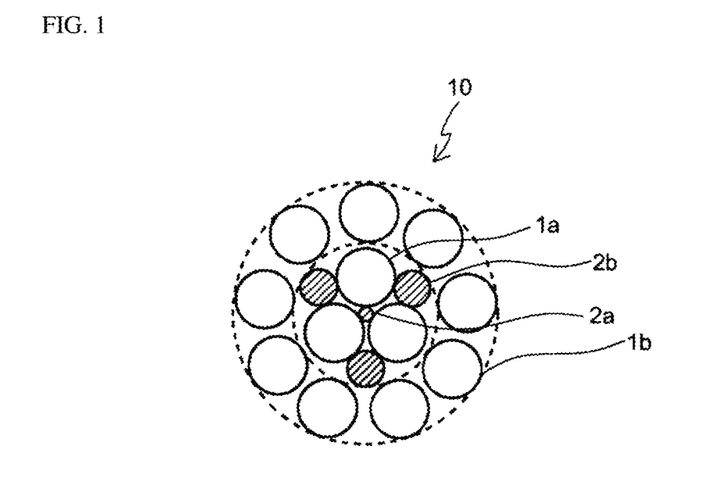
FIG. 1 is a cross-sectional view of a cord for reinforcing elastomers prior to vulcanization, taken along a direction orthogonal to the axial direction according to a preferred embodiment of the present invention.

The cord for reinforcing elastomers of the present invention includes metallic filaments and resin filaments twisted together, the resin filaments being made from a polymeric material having a melting point or softening point of 80° C. to 160° C. FIG. 1 is a cross-sectional view of the cord for reinforcing elastomers prior to vulcanization, taken along a direction orthogonal to the axial direction according to a preferred embodiment of the present invention. As illustrated in FIG. 1, a cord 10 of the present invention includes a core and at least one sheath layer. In the illustrated example, the cord 10 includes a core that is made by twisting three metallic filaments 1a together and a sheath layer that is made by winding nine metallic filaments 1b around the core, which are twisted together. In addition, one resin filament 2a is placed at the center of the core and three resin filaments 2b are twisted around the core. However, structures of the cord of the present invention are not limited thereto.

Figure 2:
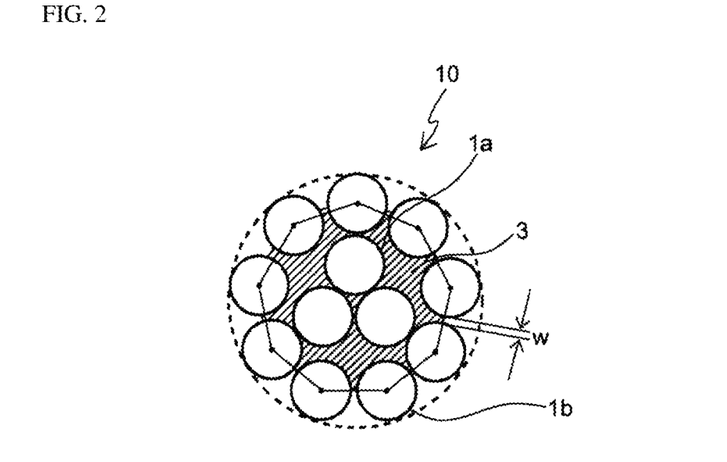
FIG. 2 is a cross-sectional view of the cord for reinforcing elastomers subsequent to vulcanization, taken along a direction orthogonal to the axial direction according to a preferred embodiment of the present invention.

FIG. 2 is a cross-sectional view of the cord for reinforcing elastomers subsequent to vulcanization, taken along a direction orthogonal to the axial direction according to a preferred embodiment of the present invention. In the cord 10 of the present invention, the distance w between the metallic filaments 1b forming the outermost sheath layer subsequent to vulcanization is 100 μm or less. Such configuration achieves reduction in the area of contact between a polymeric material 3 derived from the resin filaments and an elastomer such as rubber subsequent to vulcanization. As a result, the adhesion strength by which the cord 10 and the elastomer adhere to each other is prevented from decreasing, and thus the product durability is not impaired. The distance w between the metallic filaments 1b forming the outermost sheath layer is suitably 20 μm or less.

On a cross section of the cord 10 of the present invention taken along a direction orthogonal to the axial direction, a filling ratio, which is defined as a ratio of the area of the polymeric material 3 derived from the resin filaments 2a and 2b after vulcanization to a gap region is 52 to 120%, where the gap region is defined as a region other than the metallic filaments 1a, 1b within a region formed by connecting the centers of the individual metallic filaments 1b constituting the outermost sheath layer. When the ratio of the polymeric material 3 to the gap region is less than 52%, gaps inside the cord 10 cannot be fully filled, failing in effective prevention of rust formation in the metallic filaments 1a and 1b. On the other hand, when the ratio of the polymeric material 3 to the gap region exceeds 120%, a higher amount of the polymeric material 3 will flow out of the outermost sheath layer and hinder adhesion between the cord 10 and the elastomer. It is preferable that the filling ratio is 60 to 120% and that 50% or more of the surface area of the metallic filaments 1b constituting the outermost sheath layer is in contact with the elastomer.

When cross sections of the cord 10 of the present invention taken along a direction orthogonal to the axial direction are observed at 2 mm intervals over the range of twice the twist pitch of the outermost sheath layer, it is preferable that three or more voids on adjacent observed sections are not communicatively connected along the axial direction. In other words, it is preferable that voids in the gap region are not communicatively connected along the cord axial direction by 6 mm or more. Voids communicatively connected in the gap region would form a water passing path, leading to rust development in the metallic filaments 1a and 1b. In contrast, the cord 10 in the aforementioned state forms a containment system in the gap region, and thus rust development along the axial direction can be effectively prevented.

In the cord 10 of the present invention, no specific restriction is imposed on a polymeric material forming the resin filaments 2a and 2b as long as the polymeric material has a melting point or softening point of 80 to 160° C., preferably 130 to 160° C. Examples of the polymeric material that can be used include an ionomer, an acid-modified resin, and a combination thereof. As an acid-modified resin, a resin modified by an acid anhydride of, for example, dimer acid, maleic acid, or itaconic acid is preferred among others. A maleic acid-modified resin can improve the adhesion to the metallic filaments 1a and 1b.

Examples of the maleic acid-modified resin include maleic-anhydride-modified styrene-ethylene-butadiene-styrene block copolymer (SEBS), maleic acid-modified polyethylene, maleic-anhydride-modified ultralow density polyethylene, maleic-anhydride-modified ethylene-butene-1 copolymer, maleic-anhydride-modified ethylene-propylene copolymer, maleic-anhydride-modified ethylene-octene, and maleic-anhydride-modified propylene. Among others, maleic acid-modified polyethylene is particularly preferred.

In the cord 10 of the present invention, the resin filaments 2a and 2b preferably include an ionomer. An ionomer helps to smooth surfaces of the resin filaments 2a and 2b to improve fiber spinnability, and also helps to make the resin filaments 2a and 2b more slidable in a twist machine.

Specific examples of the ionomer include zinc ion-neutralized ionomers such as Himilan® 1554, Himilan® 1557, Himilan® 1650, Himilan® 1652, Himilan® 1702, Himilan® 1706, and Himilan® 1855 and sodium ion-neutralized ionomers such as Himilan® 1555, Himilan® 1601, Himilan® 1605, Himilan® 1707, Himilan® 1856, and AM7331, which are made by Du Pont-Mitsui Polychemicals Co., Ltd. Other examples thereof include lithium ion-neutralized ionomers such as Surlyn® 7930 and sodium ion-neutralized ionomers such as Surlyn® 8120, which are made by DuPont. These may be used singly or in combination of two or more thereof.

As commercially available specific products, the polymeric material for the resin filaments 2a and 2b in the cord 10 according to the present invention may be, for example, Tuftec™ including M1943, M1911, and M1913 made by Asahi Kasei Corporation. Other examples thereof include ADMER™ including LB548, NF518, QF551, QF500, and QE060, Hi-Wax™ including 4051E, 4252E, and 1105A, TAFMER™ including MH7010 and MH7020, which are made by Mitsui Chemicals, Incorporated; the NUCREL™ series and the Elvaloy™ series made by Du Pont-Mitsui Polychemicals Co., Ltd.; the MODIC™ series made by Mitsubishi Chemical Corporation; the OREVAC® series, the BONDINE® series, and the LOTRYL® series made by Arkema S.A.; the REXPEARL™ series made by Japan Polyethylene Corporation; the ACRYFT® series made by Sumitomo Chemical Company, Limited; fluorine-based ionomers made by Asahi Kasei Corporation; and the ethylene-ethyl acrylate copolymer made by NUC Corporation. These may be used singly or in a mixture of two or more thereof.

In the cord 10 of the present invention, the resin filaments 2a and 2b preferably have a wire diameter of 0.1 mm or larger. When the resin filaments 2a and 2b have a diameter of less than 0.1 mm, the resin filaments may be broken while being twisted with the metallic filaments 1a and 1b, making it difficult to produce a cord having the intended structure. No specific restriction is imposed on an upper limit of the wire diameter of the resin filaments 2a and 2b, and the upper limit can be appropriately determined so as to make the polymeric material account for 52 to 120% of the gap region after vulcanization.

In the cord 10 of the present invention, the polymeric material forming the resin filaments 2a and 2b preferably has a melt flow rate (MFR) of 7.0 g/min or higher, the melt flow rate being defined in JIS K 7210. When the MFR is less than 7.0 g/min., although the resin filaments 2a and 2b are melted during vulcanization, the polymeric material 3 is not sufficiently fluidic within the gap region inside the cord, which may result in failing to provide effects of the present invention satisfactorily.

In the cord 10 of the present invention, the resin filaments 2a and 2b may contain an inorganic filler. The foregoing states that the resin filaments 2a and 2b have a melting point of 80° C. to 160° C. because these resin filaments need to easily melt at a vulcanization temperature. However, when the melting point is low, the strength of the resin filaments 2a and 2b is also reduced, so that the resin filaments 2a and 2b may be broken during twisting, which may reduce the productivity. For this reason, an inorganic filler may be added to the resin filaments 2a and 2b in the cord 10 of the present invention so as to improve the strength of the resin filaments 2a and 2b. In addition, adding an inorganic filler to the resin filaments 2a and 2b provides an effect of reducing tucks on surfaces of the resin filaments 2a, 2b, as a result, the sliding property of the resin filaments 2a and 2b is further improved, and the steel cord 10 can be easily twisted.

An inorganic filler is added in an amount of preferably 0.1 to 30 parts by mass, more preferably 0.5 to 30 parts by mass, still more preferably 5 to 30 parts by mass, and particularly preferably 10 to 20 parts by mass, based on 100 parts by mass of the polymeric material. When an inorganic filler added in an amount of less than 0.1 parts by mass based on 100 parts by mass of the polymeric material, the effect of reinforcing the resin filaments 2a and 2b is not provided satisfactorily. On the other hand, when an inorganic filler is added in an amount of greater than 30 parts by mass, the effect of reinforcing the resin filaments 2a and 2b becomes saturated, which is not favorable from the viewpoint of cost, while the inorganic filler is dispersed to a lesser extent, which may adversely affect the durability of the resin filaments 2a and 2b.

Examples of the inorganic filler for the cord 10 of the present invention include carbon black, silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate. These may be used singly or in combination of two or more thereof. From the viewpoint of reinforcing the resin filaments 2a and 2b, carbon black is preferred among others. Furthermore, in general, a rubber composition included in a tire also contains carbon black, and thus the resin filaments 2a and 2b in the cord 10 of the present invention are more compatible with the rubber composition included in a tire, and the resins are expected to more firmly adhere to the rubber.

In the case of using carbon black, no specific restriction is imposed on the grade of carbon and any suitable grade may be selected. For example, SRF, GPF, FEF, HAF, ISAF, or SAF may be used and, in particular, those grades with excellent flex resistance and fracture resistance including FEF, HAF, ISAF, and SAF are suitably used. The specific surface area by nitrogen adsorption N2SA (compliant with HS K 6217-2:2001) of carbon black is preferably 30 to 150 $m^2/g$, more preferably 35 to 130 $m^2/g$.

Note that the resin filaments 2a and 2b included in the cord 10 of the present invention may contain a thermoplastic resin and/or a thermoplastic elastomer to the extent that the aforementioned effects are not suppressed. In addition, various additives including an anti-aging agent, an oil, a plasticizer, a color former, and a weatherproof agent may be contained (blended).

The resin filaments 2a and 2b included in the cord 10 of the present invention can be manufactured by using a known method, and no specific restriction is imposed on the manufacturing method. For example, the resin filaments can be manufactured by kneading the above-described resin with the above-described inorganic filler and drawing the resulting resin composition. The resin filaments can also be manufactured by producing a master batch in which the above-described inorganic filler is added in a large amount to the above-described resin in advance, adding a resin to the master batch to create a resin composition containing a predetermined amount of the inorganic filler, and drawing the resin composition.

In the cord 10 of the present invention, no specific restriction is imposed on the wire diameter, tensile strength, and cross-sectional shape of the metallic filaments 1a and 1b. For example, the metallic filaments 1a and 1b may have a wire diameter of 0.10 mm to 0.60 mm. Preferably, the wire diameter is 0.12 to 0.50 mm. When the metallic filaments 1a and 1b have a wire diameter of less than 0.10 mm, voids inside the cord are so small that the cord is not strong enough to stably produce the resin filaments needed for the filling. On the other hand, making the diameter larger so as to gain the strength may cause concern about a detrimental effect on cord twist properties. In addition, the metallic filaments 1a and 1b having a wire diameter of greater than 0.60 mm have a limited tensile strength, which means such metallic filaments 1a and 1b are disadvantageous for lighter weight in exchange for gaining a necessary strength.

In the cord 10 of the present invention, the metallic filaments 1a and 1b are generally described as a linear metal containing steel, that is, containing iron as the main component (iron accounts for greater than 50% by mass of the total mass of the metallic filaments). The metallic filaments may be composed of iron only, or may contain metals other than iron such as zinc, copper, aluminum, and tin.

In the cord 10 of the present invention, plating may be given to surfaces of the metallic filaments 1a and 1b. The plating is not limited to any specific type. For example, zinc plating, copper plating, brass plating, or bronze plating may be provided. Brass plating is preferred among others. This is because a metallic filament coated with brass is excellent in adhesion to rubber. In general, the ratio of copper to zinc (copper:zinc) for brass plating is 60 to 70:30 to 40 by mass. In general, a plating layer has a thickness of 100 nm to 300 nm.

No specific restriction is imposed on the structure of the cord 10 of the present invention as long as the cord 10 includes a core and at least one sheath layer. Preferably, the cord 10 after vulcanization has a layer-twisted structure, such as, for example, a cord having an n+m structure such as 1+6, 2+6, 2+8, 3+7, 3+8, or 3+9, a cord having an n+m+1 structure such as 3+9+15 or 1+6+11, or a cord having a so-called compact structure such as 1+6, 2+8, 3+9, or 1+6+12, or the cord 10 after vulcanization is a steel cord having a multi-twisted structure obtained by further twisting the aforementioned structures. In a cord having a structure in which the core is made by twisting three metallic filaments together, it is difficult for an elastomer to penetrate into a void inside the core; however, such a structure is particularly preferred for the cord 10 of the present invention because the resin filament 1a placed inside the core as illustrated in FIG. 1 fills the void in the center of the core with a polymeric material after vulcanization.

In the cord 10 of the present invention, no specific restriction is imposed on where the resin filaments 2a and 2b are placed, and the positions thereof can be appropriately determined so as to make the polymeric material account for 52 to 120% of the gap region after vulcanization. In order that effects of the present invention can be advantageously provided, it is preferable that the resin filaments are placed, for example, inside the outermost sheath layer filaments in the case of a steel cord in a layer-twisted structure, or inside the outermost sheath layer strands or inside the outermost sheath layer filaments of each strand in the case of a steel cord in a multi-twisted structure.

The resin filaments 2a and 2b have an enhanced strength. Thus, the cord 10 of the present invention can be manufactured by twisting the resin filaments 2a and 2b simultaneously with twisting the steel cord 10 using a twisting machine typically used for producing steel cords for tires. As a result, an extra work process is not added and productivity is not reduced. To prevent breakage of twisted strands made of different materials, that is, the steel filaments 1a and 1b and the resin filaments 2a and 2b, a resin material having a strength as high as possible is preferably used. The Rockwell hardness (H scale) of the resin material is preferably 30 to 150. When the resin material has a Rockwell hardness of greater than 150, the resin filaments 2a and 2b become difficult in terms of plastic forming to impair twist properties of the cord 10. The strength of the resin filaments 2a and 2b can be enhanced by increasing the drawing ratio used for manufacturing the resin filaments 2a and 2b. In addition, it is preferable that the resin filaments 2a and 2b are well slidable in a twisting machine.

The cord 10 of the present invention is excellent in adhesion with elastomers such as rubber. Thus, the cord can be suitably used in regions where steel cord-rubber complexes have been conventionally used. In particular, the cord can be suitably used for rubber products such as tires, belts, and hoses. Examples of the tire for which the cord can be used include a tire for passenger vehicles and a tire for trucks and buses. No specific restriction is imposed on where the cord is applied. For example, the cord can be used as a material reinforcing a carcass ply or as a material reinforcing a belt. In this case, the cord may be used for reinforcing a local portion of the tread. For example, the cord 10 can be used for reinforcing a local region only, such as a region near tread ends, near the equatorial plane, or near a groove bottom, or, if applicable, ends of another inclined belt layer or ends of a circumferential cord layer.

No specific restriction is imposed on elastomers used for coating the cord 10 of the present invention, and thus the rubber or the like that has conventionally been used for coating a metallic cord can be used. Other examples of the elastomers that can be suitably used include diene rubber and hydrogenated products thereof such as natural rubber (NR), isoprene rubber (IR), epoxidized natural rubber, styrene-butadiene rubber (SBR), butadiene rubber (BR: high cis BR and low cis BR), nitrile rubber (NBR), hydrogenated NBR and hydrogenated SBR, olefin-based rubber such as ethylene-propylene rubber (EPDM, EPM), maleic acid-modified ethylene-propylene rubber (M-EPM), butyl rubber (IIR), copolymer of isobutylene and aromatic vinyl or diene monomer, acrylic rubber (ACM), ionomers, halogen-containing rubber such as Br-IIR, CI-IIR, brominated products of isobutylene-para-methylstyrene copolymer (Br-IPMS), chloroprene rubber (CR), hydrin rubber (CHR), chlorosulfonated polyethylene rubber (CSM), chlorinated polyethylene rubber (CM), maleic acid-modified chlorinated polyethylene rubber (M-CM), silicone rubber such as methylvinyl silicone rubber, dimethyl silicone rubber, and methylphenyl vinyl silicone rubber, sulfur-containing rubber such as polysulfide rubber, fluoro rubber such as vinylidene fluoride-based rubber, fluorine-containing vinyl ether-based rubber, tetrafluoroethylene-propylene-based rubber, fluorine-containing silicone-based rubber, fluorine-containing phosphazene-based rubber, and thermoplastic elastomers such as styrene-based elastomer, olefin-based elastomer, ester-based elastomer, urethane-based elastomer, and polyamide-based elastomer. These elastomers may be used singly or in a mixture of two or more thereof.

EXAMPLES

The present invention will now be described in more detail in Examples below.

Examples 1 to 7 and Comparative Examples 1 to 3

Figure 3:
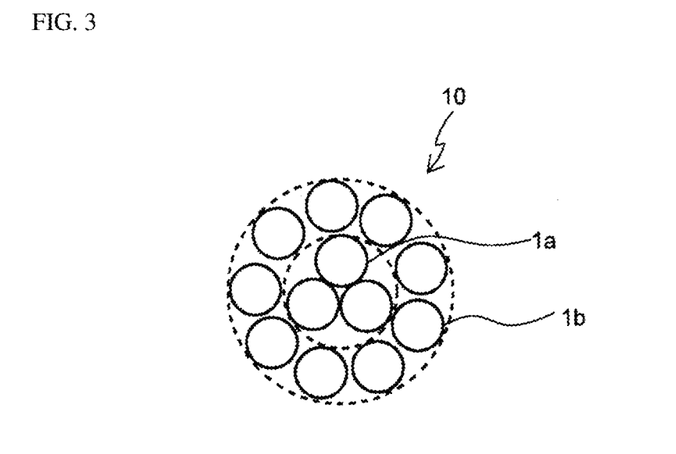
FIG. 3 is a cross-sectional view of a cord for reinforcing elastomers prior to vulcanization, taken along a direction orthogonal to the axial direction according to Comparative Example 1.
Figure 4:
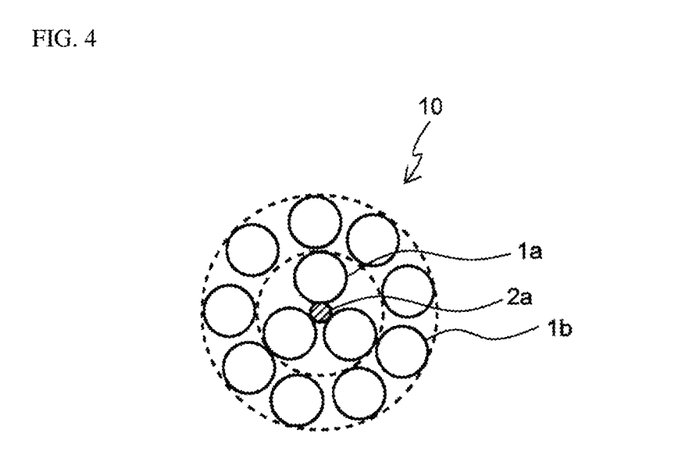
FIG. 4 is a cross-sectional view of a cord for reinforcing elastomers prior to vulcanization, taken along a direction orthogonal to the axial direction according to Comparative Example 2.
Figure 9:
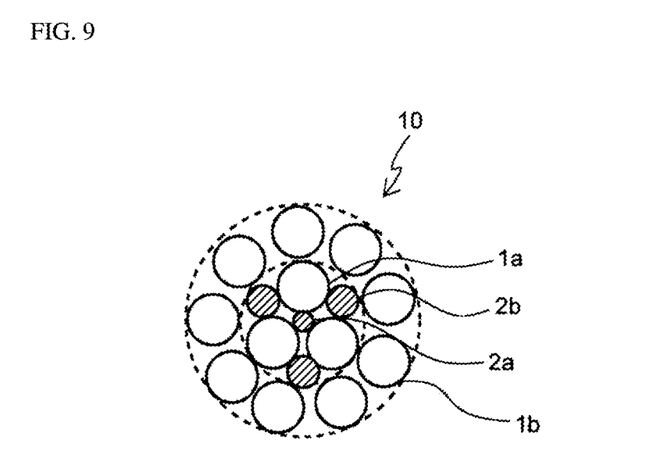
FIG. 9 is a cross-sectional view of a cord for reinforcing elastomers prior to vulcanization, taken along a direction orthogonal to the axial direction according to Example 5.

In Example 5 and Comparative Examples 1 and 2, cords in structures illustrated in FIGS. 9, 3 and 4, respectively, were produced by using a tubular type twisting machine with the steel filaments whose diameters are listed in Tables 1 and 2 and the resin filaments whose diameters are listed in the same tables. In Example 5 and Comparative Examples 1 and 2, resulting cords were each coated with coating rubber, thereby producing cord-rubber complexes. In Examples 1-4, 6 and 7, and Comparative Example 3, cords are produced by using a tubular type twisting machine with the steel filaments whose diameters are listed in Tables 1 and 2 and the resin filaments whose diameters are listed in the same tables. In Examples 1-4, 6 and 7, and Comparative Example 3, cords are each coated with coating rubber, to thereby produce cord-rubber complexes. In the aforementioned tables, "A" for the resin filament type represents a resin (softening point: 95° C.) obtained by mixing Himilan® 1702 (made by Du Pont-Mitsui Polychemicals Co., Ltd.) and Tuftec™ M1943 (made by Asahi Kasei Corporation) at a ratio of 8:2, and "B" for the resin filament type represents Himilan® 1702 (melting point: 90° C.).

Figure 5:
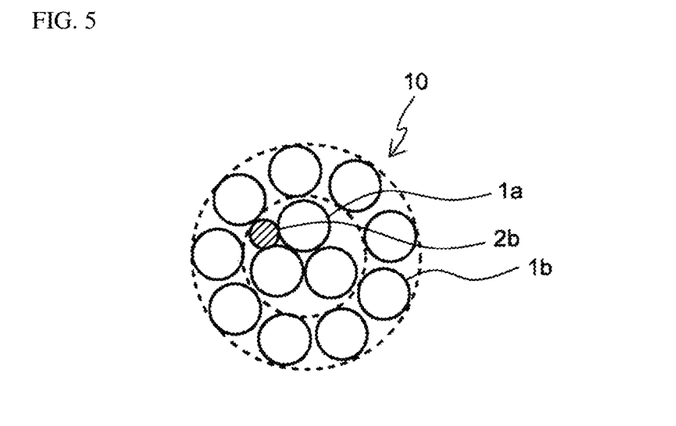
FIG. 5 is a cross-sectional view of a cord for reinforcing elastomers prior to vulcanization, taken along a direction orthogonal to the axial direction according to Example 1.
Figure 6:
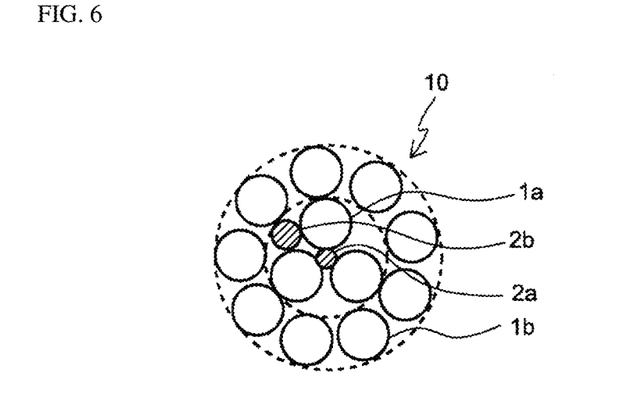
FIG. 6 is a cross-sectional view of a cord for reinforcing elastomers prior to vulcanization, taken along a direction orthogonal to the axial direction according to Example 2.
Figure 7:
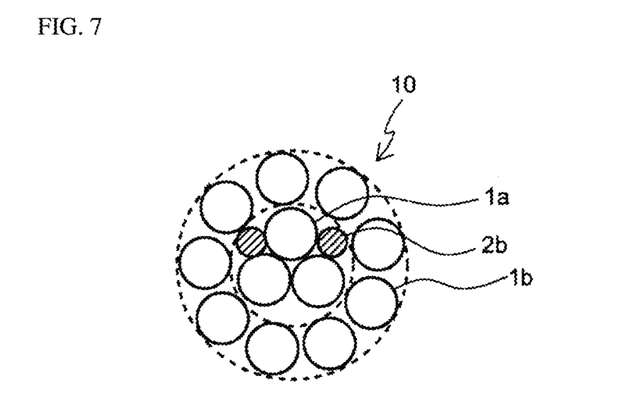
FIG. 7 is a cross-sectional view of a cord for reinforcing elastomers prior to vulcanization, taken along a direction orthogonal to the axial direction according to Example 3.
Figure 8:
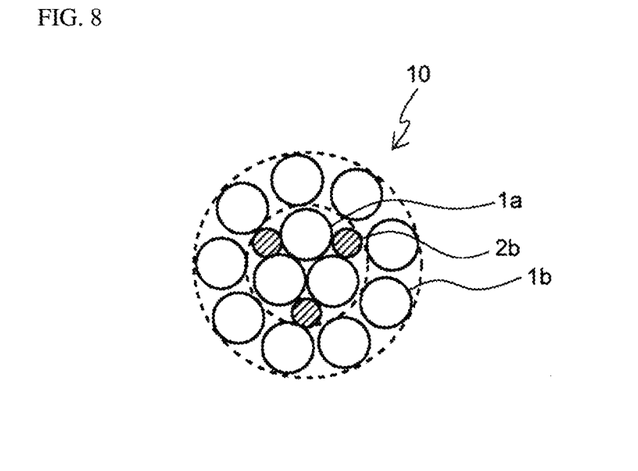
FIG. 8 is a cross-sectional view of a cord for reinforcing elastomers prior to vulcanization, taken along a direction orthogonal to the axial direction according to Example 4.

FIG. 3 shows a cross section of a cord according to Comparative Example 1, FIG. 4 shows a cross section of a cord according to Comparative Example 2, FIG. 5 shows a cross section of a cord which is in expected in accordance with Example 1, FIG. 6 shows a cross section of a cord which is in expected in accordance with Example 2, FIG. 7 shows a cross section of a cord which is in expected in accordance with Example 3, FIG. 8 shows a cross section of a cord which is in expected in accordance with Example 4, and FIG. 9 shows a cross section of a cord according to Example 5. Wire diameters of the steel filaments and the resin filaments 2a and 2b are listed in Tables 1 and 2.

In Example 5 and Comparative Examples 1 and 2, the resulting cord-rubber complexes were each vulcanized at 145° C. for 40 minutes. After vulcanization, a steel cord with rubber was cut out from each of the cord-rubber complex of Example 5 and Comparative Examples 1 and 2, and surfaces of the cord were coated with silicone sealant. After being dried, each cord of Example 5 and Comparative Examples 1 and 2 was cut at its both ends into a 100 mm long sample. One end of the cord of Example 5 and Comparative Examples 1 and 2 was covered with a resin while the other end was immersed in 10% aqueous sodium hydroxide for 24 hours. Then, the cord of each of Example 5 and Comparative Examples 1 and 2 was removed from the solution and the length of rubber peeled off from the cord end (rust development length) was measured. In Example 5 and Comparative Examples 1 and 2, the above procedure was repeated for N=10 to 30 sample cords, and comparison and evaluation were conducted on the samples regarding the variation and absolute value levels based on a range from the minimum to the maximum of the peel-off length and on the median value. Cord structures, filling ratios, and rust development lengths for Example 5 and Comparative Examples 1 and 2 are summarized in Tables 1 and 2.

In Example 1-4, 6 and 7, and Comparative Example 3, the cord-rubber complexes are each vulcanized at 145° C. for 40 minutes. After vulcanization, a steel cord with rubber is cut out from each of the cord-rubber complex of Example 1-4, 6, and 7, and Comparative Example 3, and surfaces of the cord are coated with silicone sealant. After drying, each cord of Example 1-4, 6, and 7, and Comparative Example 3 is cut at its both ends into a 100 mm long sample. One end of the cord of each of Example 1-4, 6, and 7, and Comparative Example 3 is covered with a resin while the other end is immersed in 10% aqueous sodium hydroxide for 24 hours. Then, the cord of each of Example 1-4, 6, and 7, and Comparative Example 3 is removed from the solution and the length of rubber peeled off from the cord end (rust development length) is measured. In Example 1-4, 6, and 7, and Comparative Example 3, the above procedure is repeated for N=10 to 30 sample cords, and comparison and evaluation are conducted on the samples regarding the variation and absolute value levels based on a range from the minimum to the maximum of the peel-off length and on the median value. Expected cord structures, filling ratios, and rust development lengths for Examples 1-4, 6 and 7 and Comparative Example 3 are also summarized in Tables 1 and 2.

Figure 10:
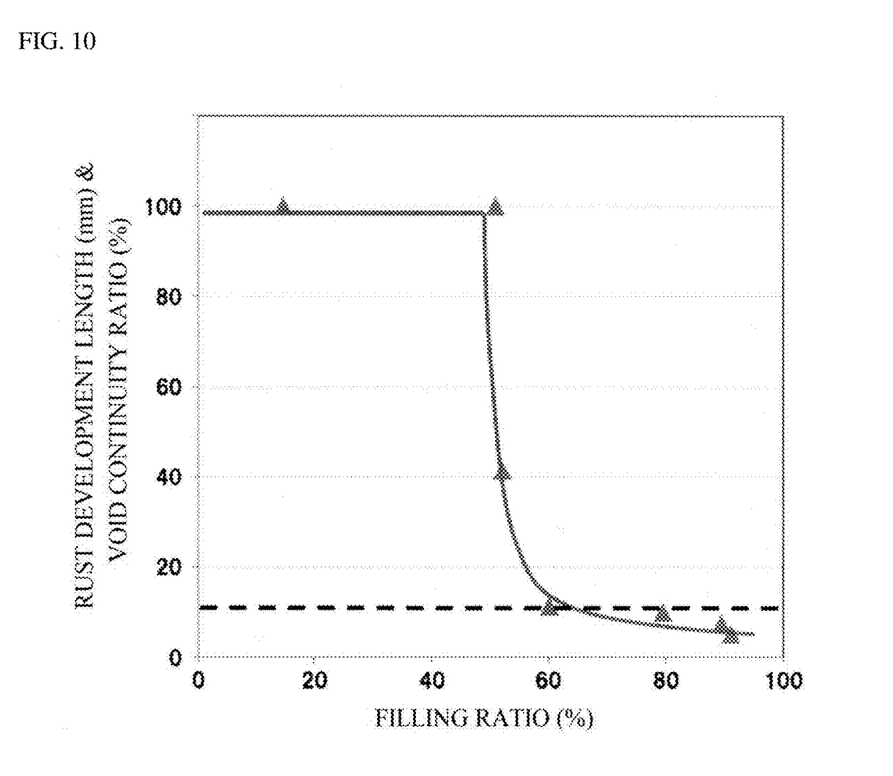
FIG. 10 is a graph indicating a relationship between the filling ratio and the rust development length and void development ratio.

FIG. 10 shows a graph indicating an expected relationship between the filling ratio and the rust development length.

TABLE 1

|  | Comparative Example 1 | Comparative Example 2 | Example 1 | Example 2 | Example 3 |
|---|---|---|---|---|---|
| Cord structure | FIG. 3 | FIG. 4 | FIG. 5 | FIG. 6 | FIG. 7 |
| Steel filament diameter (mm) | 0.34 | 0.34 | 0.34 | 0.34 | 0.34 |
| Resin filament type | — | A | A | A | A |
| Resin filament 2a diameter (mm) | — | 0.20 | — | 0.20 | — |
| Resin filament 2b diameter (mm) | — | — | 0.25 | 0.25 | 0.25 |
| Distance between metallic filaments w (μm) | 26.8 | 30 | 32 | 33 | 34 |
| Filling ratio (%) | 14.7 | 51 | 52 | 60 | 80 |
| Rust development length (mm) | 100 | 100 | 42 | 11 | 10 |

TABLE 2

|  | Example 4 | Example 5 | Comparative Example 3 | Example 6 | Example 7 |
|---|---|---|---|---|---|
| Cord structure | FIG. 8 | FIG. 9 | 3 + 7 | FIG. 7 | FIG. 7 |
| Steel filament diameter (mm) | 0.34 | 0.34 | 0.34 | 0.23 | 0.34 |
| Resin filament type | A | A | — | A | B |
| Resin filament 2a diameter (mm) | — | 0.20 | — | — | — |
| Resin filament 2b diameter (mm) | 0.25 | 0.325 | — | 0.17 | 0.25 |
| Distance between metallic filaments w (μm) | 36 | 61 | 125 | 18 | 36 |
| Filling ratio (%) | 89 | 91 | 50 | 80 | 78 |
| Rust development length (mm) | 7.6 | 5.2 | 50 | 10 | 9.5 |

FIG. 10 indicates that the rust development length is expected to be improved when the filling ratio is higher than 52%.

DESCRIPTION OF SYMBOLS 1a, 1b Metallic filament
2a, 2b Resin filament
3 Polymeric material
10 Cord for reinforcing elastomers (cord)

The invention claimed is:
1. A cord for reinforcing elastomers, the cord comprising metallic filaments and a polymeric material,
  wherein the cord for reinforcing elastomers comprises a core and at least one sheath layer,
  wherein, a gap formed by the metallic filaments forming an outer most sheath layer has a distance of 100 μm or less, and, on a cross section of the cord taken along a direction orthogonal to an axial direction, a filling ratio, which is a ratio of an area of the polymeric material to a gap region is 52 to 120%, where the gap region is defined as a region other than the metallic filaments within a region formed by connecting centers of the individual metallic filaments constituting the outermost sheath layer, and wherein the polymeric material has a melting point or softening point of 80° C. to 160° C.

2. The cord for reinforcing elastomers according to claim 1, wherein the filling ratio is 60 to 120%.

3. The cord for reinforcing elastomers according to claim 1, wherein, when cross sections of the cord for reinforcing elastomers taken along a direction orthogonal to the axial direction are observed at 2 mm intervals over a range of twice a twist pitch of the outermost sheath layer, three or more voids on adjacent observed sections are not communicatively connected along the axial direction.

4. The cord for reinforcing elastomers according to claim 1, wherein the distance between the metallic filaments forming the outermost sheath layer is 20 µm or less.

5. The cord for reinforcing elastomers according to claim 1, wherein the polymeric material includes maleic acid-modified polyethylene.

6. The cord for reinforcing elastomers according to claim 1, wherein the polymeric material includes an ionomer.

7. The cord for reinforcing elastomers according to claim 1, wherein a melt flow rate, which is described in JIS K 7210, of the polymeric material is 7.0 g/min. or higher.

8. The cord for reinforcing elastomers according to claim 1, wherein the polymeric material has a melting point or softening point of 130 to 160° C.

9. The cord for reinforcing elastomers according to claim 1, wherein the core is made by twisting three metallic filaments together.

10. The cord for reinforcing elastomers according to claim 2, wherein, when cross sections of the cord for reinforcing elastomers taken along a direction orthogonal to the axial direction are observed at 2 mm intervals over a range of twice a twist pitch of the outermost sheath layer, three or more voids on adjacent observed sections are not communicatively connected along the axial direction.

11. The cord for reinforcing elastomers according to claim 2, wherein the distance between the metallic filaments forming the outermost sheath layer is 20 µm or less.

12. The cord for reinforcing elastomers according to claim 2, wherein the polymeric material includes maleic acid-modified polyethylene.

13. The cord for reinforcing elastomers according to claim 2, wherein the polymeric material includes an ionomer.

14. The cord for reinforcing elastomers according to claim 2, wherein a melt flow rate, which is described in JIS K 7210, of the polymeric material is 7.0 g/min. or higher.

15. The cord for reinforcing elastomers according to claim 2, wherein the polymeric material has a melting point or softening point of 130 to 160° C.

16. The cord for reinforcing elastomers according to claim 2, wherein the core is made by twisting three metallic filaments together.

17. The cord for reinforcing elastomers according to claim 3, wherein the distance between the metallic filaments forming the outermost sheath layer is 20 µm or less.

18. The cord for reinforcing elastomers according to claim 3, wherein the polymeric material includes maleic acid-modified polyethylene.

19. The cord for reinforcing elastomers according to claim 1, wherein the filling ratio is 52 to 100%.

\* \* \* \* \*